(12) United States Patent
Lincoln et al.

(10) Patent No.: US 7,866,218 B2
(45) Date of Patent: Jan. 11, 2011

(54) ELECTROMAGNETIC FLOW METER

(75) Inventors: David Lincoln, Shanghai (CN); Michael Armitage, Stroud (GB)

(73) Assignee: ABB Limited, Stonehouse, Gloucestershire (GB)

( * ) Notice: Subject to any disclaimer, the term of this patent is extended or adjusted under 35 U.S.C. 154(b) by 0 days.

(21) Appl. No.: 12/541,151

(22) Filed: Aug. 13, 2009

(65) Prior Publication Data

US 2010/0101331 A1  Apr. 29, 2010

(30) Foreign Application Priority Data

Aug. 14, 2008  (GB)  ................................. 0814898.3

(51) Int. Cl.
*G01F 1/58* (2006.01)
(52) U.S. Cl. .................................. 73/861.12
(58) Field of Classification Search .. 73/861.12–861.17
See application file for complete search history.

(56) References Cited

U.S. PATENT DOCUMENTS

| | | | |
|---|---|---|---|
| 3,924,466 A | | 12/1975 | Medlar |
| 4,236,410 A | * | 12/1980 | Appel et al. ............. 73/861.12 |
| 4,409,846 A | * | 10/1983 | Ueno ....................... 73/861.17 |
| 4,736,634 A | * | 4/1988 | Amata .................... 73/861.12 |
| 5,207,105 A | * | 5/1993 | Fukunaga et al. ........ 73/861.12 |
| 2006/0272427 A1 | * | 12/2006 | Zingg et al. .............. 73/861.12 |
| 2007/0093633 A1 | | 4/2007 | Brobeil et al. |

FOREIGN PATENT DOCUMENTS

| | | |
|---|---|---|
| EP | 1 882 163 | 11/2006 |
| GB | 0 899095 | 6/1962 |
| GB | 2 059 066 | 4/1981 |
| GB | 2 440 963 | 2/2008 |
| JP | 58-213214 | 12/1983 |
| JP | 06-174511 | 6/1994 |
| WO | WO 2006/122878 | 11/2006 |

OTHER PUBLICATIONS

Patents Act 1977: Search Report under Section 17(5) for United Kingdom Counterpart Application No. GB0814898.3, 7 pages, (Dec. 8, 2008).

* cited by examiner

*Primary Examiner*—Jewel Thompson
(74) *Attorney, Agent, or Firm*—Blakely, Sokoloff, Taylor & Zafman LLP.

(57) ABSTRACT

An electromagnetic flow meter is described having a pressure containing vessel or conduit through which the fluid to be metered is passed. The pressure containing vessel is formed of first and second sections which are made of respective materials having first and second magnetic permeabilities, such as stainless steel and carbon steel. A single magnetic field generating coil is provided adjacent the first section for generating a magnetic field across the pressure containing vessel.

28 Claims, 8 Drawing Sheets

ELECTROMAGNETIC FLOW METER

FIELD

The present invention relates to an electromagnetic flow meter, to parts thereof and to methods of making an electromagnetic flow meter.

BACKGROUND

Electromagnetic flow meters, and their methods of operation, are well known. In use, an electromagnetic field is generated whose lines of flux are mutually perpendicular to the longitudinal axis of the flow conduit through which the fluid to be metered is conducted and to the transverse axis along which the electrodes are normally located at opposite positions with respect to the conduit. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous values of the voltage established at the electrodes.

Electromagnetic flow metering is a mature and robust technology with the first commercial units being sold over 50 years ago. However, the cost of electromagnetic flow meters is relatively high due to the materials used in their construction and necessarily high labor costs.

Existing commercial electromagnetic flow meters typically employ two coils positioned on either side of the flow conduit in order to generate an homogenous magnetic field across the flow conduit. The coils may be mounted on the outside of the flow conduit or on the inside of the flow conduit.

When the coils are mounted on the outside of the flow conduit, the flow conduit has to be made from a material through which the magnetic field generated by the coils can pass and it must be able to withstand the operating pressure of the fluid flowing inside the conduit. Stainless steel tubing is commonly used because of its strength and non-magnetic properties. An insulating liner within the flow conduit is also provided to ensure that the electric field generated by the moving conducting liquid does not short to ground.

When the coils are mounted on the inside of the flow conduit an insert is usually provided which defines a measuring section having a narrower effective diameter than the diameter of the flow conduit. This reduced diameter measuring section provides a space between the insert and the flow conduit in which the coils can be mounted. The insert is typically manufactured by molding or extrusion using a plastics or rubber material. A stainless steel tube may be provided around the measuring section of the insert to provide the required pressure containment and/or the space between the insert and the flow conduit may be back-potted with a suitable potting compound.

Whilst smaller flow meters (those having a diameter of less than about 350 mm) can employ both techniques, larger flow meters (those having a diameter greater than about 350 mm) tend to employ coils mounted on the outside of the flow conduit due to the ease of manufacture.

SUMMARY

The present invention aims to provide at least an alternative type of electromagnetic flow meter which can be made at lower cost than currently available flow meters.

According to one embodiment, the present invention provides an electromagnetic flow meter apparatus having a pressure containing vessel or conduit formed from first and second sections superimposed on each other and in which the two sections are made of different materials. In one embodiment, the two materials are stainless steel and carbon steel and preferably the carbon steel section is larger than the stainless steel section. Both sections may be generally "U" shaped in cross-section so that when their ends are connected to each other, they form a tubular shaped pressure containing vessel or conduit.

According to another aspect, the present invention provides a flow meter having a single coil for generating a magnetic field across a flow tube and wherein the flow tube is non-magnetic in a region where the coil is located and magnetic in the regions where the coil is not located. For example, if the coil is located on a top half of the flow tube, then the top half of the flow tube is non-magnetic (and stainless steel could be used) and the bottom half can be magnetic and so carbon steel can be used. If the coil is made relatively small then more than half of the flow tube can be made from magnetic material such as carbon steel.

In another embodiment, an electromagnetic flow meter is provided having a tubular flow conduit and an insert or liner disposed therein. The insert or liner includes a first part which conforms to the shape of the tubular conduit and a second part that defines a space between the liner or insert and the tubular flow conduit, in which space a coil is mounted and which is back potted with a potting compound to support the liner or insert under the pressure of fluid flowing, in use, through the flow meter. In this embodiment, the liner or insert may define a generally asymmetric channel through which the fluid can flow.

According to one embodiment, the present invention provides an electromagnetic flow meter apparatus comprising: a flow conduit defining a flow path along which a fluid can flow, the flow conduit having: i) an inlet for receiving the fluid; ii) an outlet in fluid communication with the inlet for outputting the fluid; and iii) a measuring section which extends along the flow path and which is positioned between, and in fluid communication with, the inlet and outlet; a coil positioned adjacent the measuring section for generating a magnetic field across the measuring section; and at least one electrode positioned adjacent the measuring section for sensing a voltage induced in the fluid flowing through the measuring section as a result of said magnetic field, which voltage varies with a flow rate of the fluid; wherein the measuring section is defined by a pressure containing vessel or conduit having first and second sections; wherein the first section is formed of a first material having a first magnetic permeability and the second section is formed of a second material having a second magnetic permeability that is different from the first permeability; and wherein the coil is located adjacent the first section of the pressure containing vessel.

The second section may be substantially tubular and the first section may be positioned within the second section, such that a space is provided between said first and second sections in which the coil can be located.

The pressure containing vessel is preferably substantially tubular in shape for strength. The first and second sections of the pressure containing vessel may abut against each other along respective edges and joined together along the edges.

In one embodiment, the magnetic permeability of the first section is lower than the magnetic permeability of the second section. The first section may be made of a stainless steel that allows the magnetic field from the coil to pass into the measuring section and the second section may be made of carbon steel. The first section preferably forms a smaller part of the pressure containing vessel than said second section, especially when stainless steel is used to form the first section.

In one embodiment, the coil is a saddle shaped coil that extends along the length of the measuring section and that is curved around an outer wall of the pressure containing vessel.

When a saddle shaped coil is used, it is preferably curved around an outer wall of the pressure containing vessel over an effective angle of between 45 and 180 degrees as this produces the desired magnetic field through the measuring section. The turns of the saddle shaped coil may enclose a substantially rectangular or diamond shaped area. Alternatively, a bobbin coil wound on a pole piece may be used. Pole pieces may also be used with the saddle shaped coil to generate the desired magnetic field pattern.

Typically at least two electrodes are provided at opposite sides across the measuring section and are operable to sense the induced voltage capacitively or by being in contact with the fluid.

Typically, an insulating liner will be provided on the internal surface of the pressure containing vessel to ensure that the electric field generated by the moving liquid does not short to ground.

This aspect of the invention also provides a pressure containing vessel for use in the above apparatus, the pressure containing vessel being substantially tubular and comprising first and second sections; wherein the first section is formed of a first material having a first magnetic permeability and the second section is formed of a second material having a second magnetic permeability that is different from the first permeability.

A method of manufacturing a substantially tubular pressure vessel for use in an electromagnetic flow meter is also provided. The method comprises providing a first section of a first material having a first magnetic permeability and a second section of a second material having a second permeability that is different from the first permeability, and joining the first and second sections together to form a pressure containing vessel.

BRIEF DESCRIPTION OF THE DRAWINGS

These and other aspects of the invention will become apparent from the following detailed description of exemplary embodiments which are described with reference to the accompanying drawings in which:

FIG. 2b illustrates the outline shape of a saddle shaped coil used in the flow meter shown in FIG. 2a;

DETAILED DESCRIPTION

First Embodiment

Figure 1:
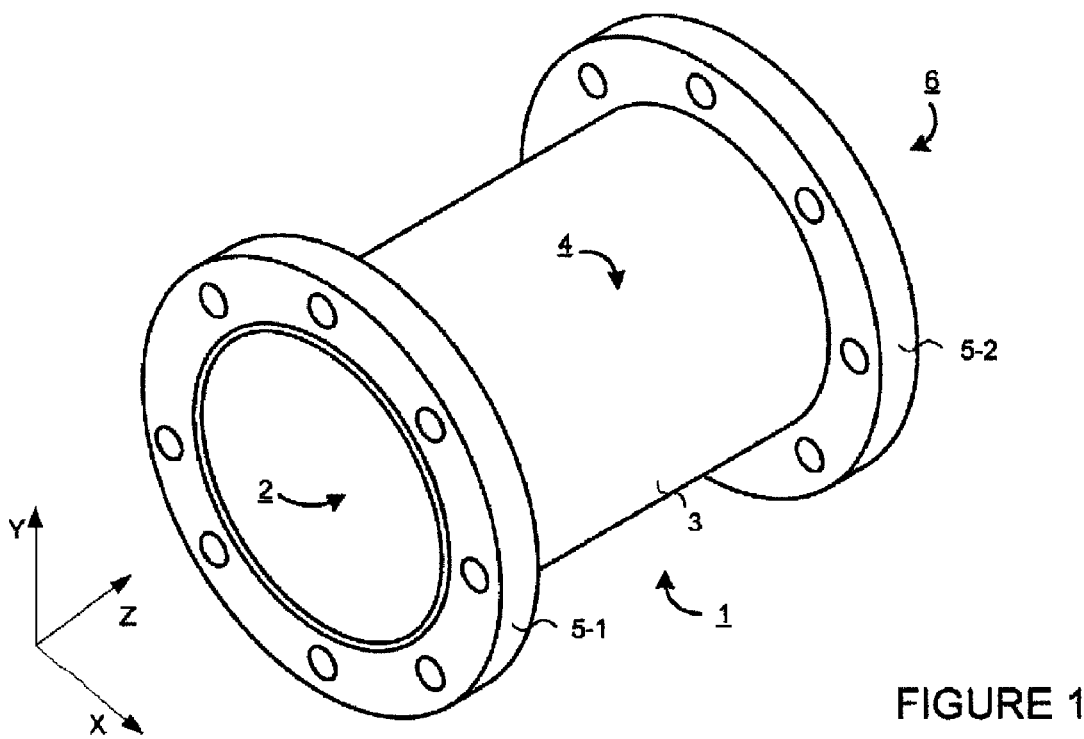
FIG. 1 is an isometric view of an electromagnetic flow meter, which can be inserted within a pipeline.

FIG. 1 is an isometric view of an electromagnetic flow meter 1 embodying the present invention. As shown, the flow meter 1 includes a housing 3 and two flanges 5-1 and 5-2 for connecting the flow meter 1 in-line between two sections of flow conduit. The housing 3 contains a flow conduit having an inlet 2 for receiving the fluid flow to be measured; a measuring section 4 in fluid communication with the inlet 2 and in which the flow measurements are made; and an outlet 6 in fluid communication with the measuring section 4 for outputting the fluid from the flow meter 1. Although not illustrated, housing 3 will normally include an outlet which may be used to provide power to an internal coil and may be used to allow readings to be obtained from internal electrodes. Alternatively, this circuitry may be provided within the housing 3 and appropriate transmitter circuitry may be provided to relay the measurements to a remote device.

Figure 2A:
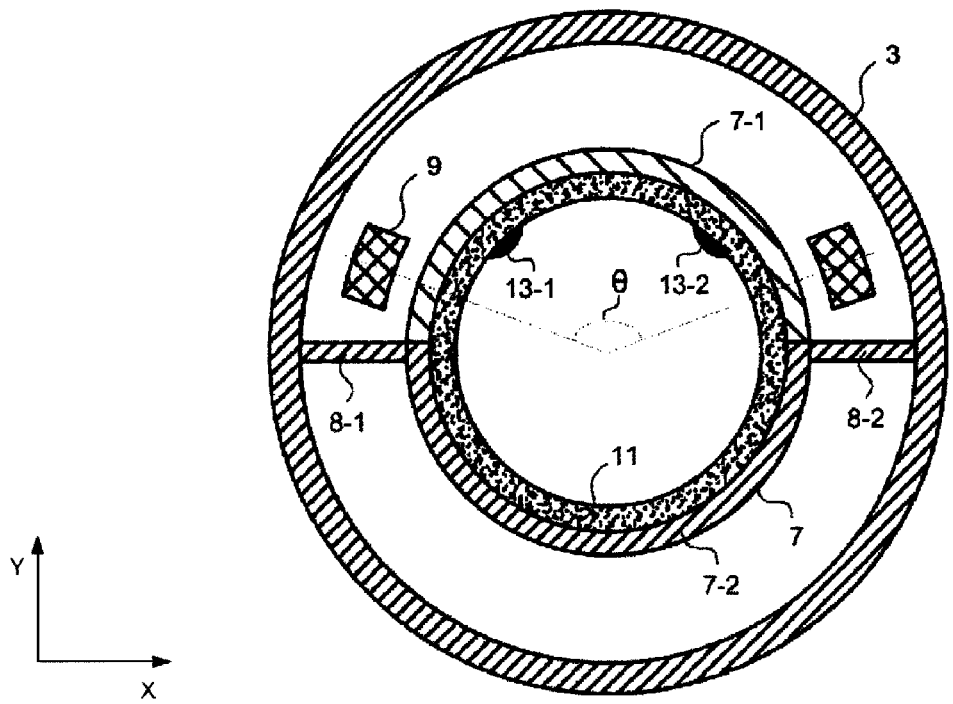
FIG. 2a is a cross sectional view of the flow meter shown in FIG. 1 in a direction transverse to the flow path, which illustrates the structure of the flow meter in a first embodiment.
Figure 2B:
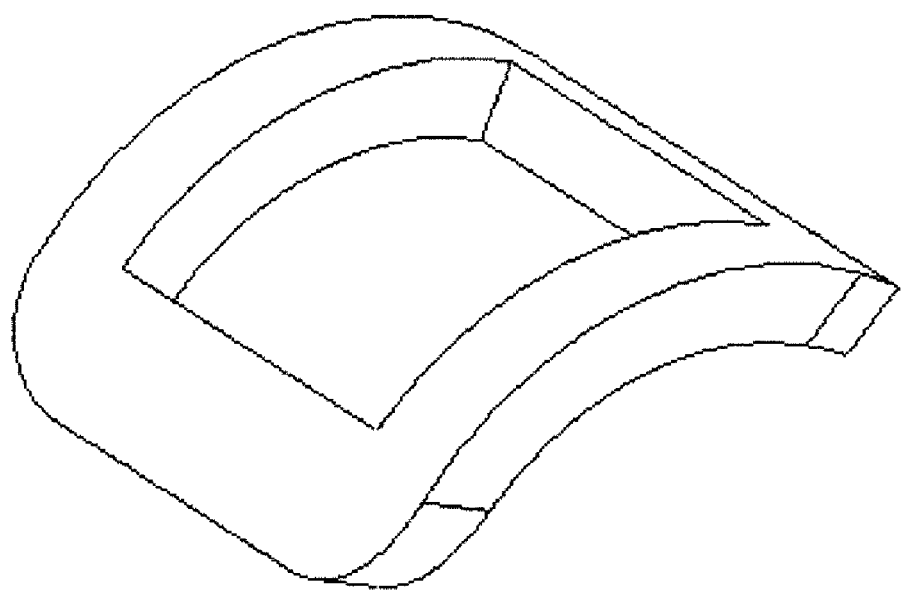

FIG. 2 is a cross-sectional view of the flow meter shown in FIG. 1 taken through the measuring section 4 in a direction transverse to the fluid flow. As shown, within the housing 3 there is provided a flow conduit 7 through which the fluid to be measured flows. The flow conduit 7 is designed to have the required structural rigidity to contain the pressure of the fluid that is to pass there through and is braced within the housing 3 by bracings 8-1 and 8-2. Steel is normally used in the construction of the flow conduit 7 to provide this structural rigidity.

FIG. 2 also shows, in cross-section, the coil 9 which is used to generate a magnetic field across the flow conduit 7 in the Y-direction. The coil 9 is a saddle shaped coil which sits over the upper half of 7-1 of the flow conduit 7. The coil 9 curves around the outer wall of the flow conduit 7 over a segment angle (θ) of approximately 145 degrees, which is measured from the central axis of the flow conduit 7 to the centers of the coil bundles of the coil 9. Although not illustrated in FIG. 2, the coil 9 may extend along the length of the flow conduit 7 over a distance of between 0.1 and 10 times the width of the flow conduit in a direction transverse to the flow path.

Figure 3:
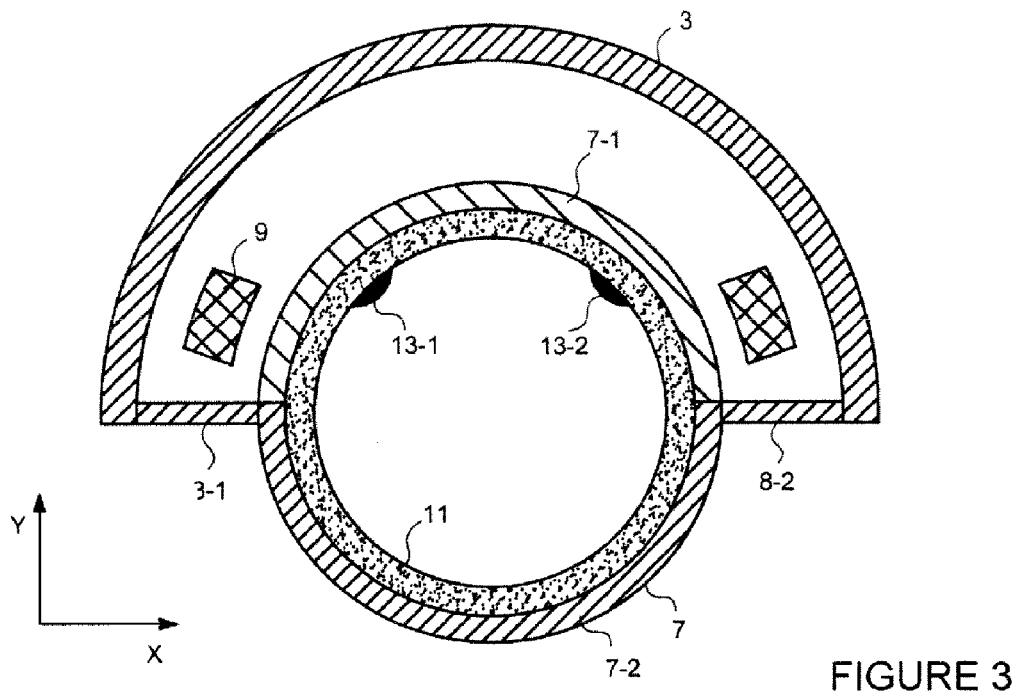
FIG. 3 is a cross sectional view of an electromagnetic flow meter according to a second embodiment.

FIG. 3 illustrates in outline the saddle shaped coil 9 used in this embodiment. As those skilled in the art will appreciate, the coil illustrated in FIG. 3 is not formed of a solid conductor, but is formed from a number of conductor turns (typically 100 or 200 turns). The number of turns, the area enclosed by the turns etc will depend on the diameter (width in a direction transverse to the fluid flow) of the measuring section 4 and hence of the flow conduit 7. Typically, the coil 9 is made by winding the coil to form a flat rectangular coil that is then deformed into a shape that conforms to the shape of the measuring section. The coil may be formed using heat-bonded wire so that it is fixed in the desired shape. Alternatively, the coil may be formed by winding the coil directly over the desired portion of the measuring section and then held in position using clamps or placed within an appropriate forming channel.

A pole piece may also be provided to help produce the required magnetic field pattern. For example, if a coil is required to cover a segment of the measuring section having a segment angle of 140 degrees, then either such a coil can be provided or a coil that covers a smaller segment angle (eg 120 degrees) can be used together with an appropriately shaped pole piece that curves around the measuring section. The two designs will produce the same or at least very similar magnetic field patterns and are therefore equivalent.

Returning to FIG. 2, an insulating liner 11 is provided within the flow conduit 7 to ensure that the electric field generated by the moving fluid does not short to ground. The liner may be made from any electrically insulating material, such as a polymer like polyurethane, rubber. Teflon, polyolefin etc. FIG. 2 also shows two electrodes 13-1 and 13-2 provided on either side of the flow conduit 7, for sensing the voltages generated within the liquid which are proportional to the velocity of the liquid in the flow conduit 7. As shown, in this embodiment, the electrodes 13 are provided inside the segment angle ($\theta$) formed by the coil 9.

As mentioned above, in this embodiment, a single coil 9 is provided on one side of the flow conduit 7. In a conventional electromagnetic flow meter, two coils are normally provided on either side of the flow conduit 7. However, the Applicant has found that accurate flow measurements can still be made with only a single coil.

The reader is referred to the Applicant's earlier GB application GB2440963 for a more detailed explanation of the operation of this kind of single coil flow meter.

As the flow meter 1 of this embodiment only has a single coil 9, only the upper half 7-1 of the flow conduit 7 needs to be made of a material through which the magnetic field created by the coil 9 can pass. The lower half 7-2 of the flow conduit 7 does not need to have this property and can have a relatively high magnetic permeability. Therefore, in this embodiment, the upper half 7-1 of the flow conduit 7 is formed from an austenitic grade of stainless steel whilst the lower half 7-2 of the flow conduit 7, the bracings 8 and the housing 3 can all be made from less expensive carbon steel. The use of carbon steel for these components also provides a return path for the magnetic field generated by the coil 9. Therefore, as those skilled in the art will appreciate, this design can significantly reduce the costs of an existing flow meter 1 which uses stainless steel for the whole flow conduit 7. Although this saving may be less on smaller diameter flow meters (such as those having a diameter less than about 350 mm), the saving can be substantial on larger flow meters having diameters in excess of 350 mm, especially for those having a diameter greater than 1000 mm.

As those skilled in the art will appreciate, various modifications can be made to the above flow meter design and some of these variations will now be described.

Second Embodiment

In the first embodiment described above, the housing 3 had a circular cross-section. The upper part of the housing 3 (ie above the bracing supports 8) protects the coil 9 and other components from the environment, but the lower half of the housing 3 below the bracing supports 8 performs no function for the flow meter and can therefore be removed. This is illustrated in FIG. 3. In order to prevent ingress of water or other contaminants in this embodiment, the bracing supports 15 are preferably solid walls which extend along the length of the flow meter 1. In this embodiment, the bracings 8 also provide a magnetic return path for the magnetic field generated by the coil 9.

Third Embodiment

Figure 4:
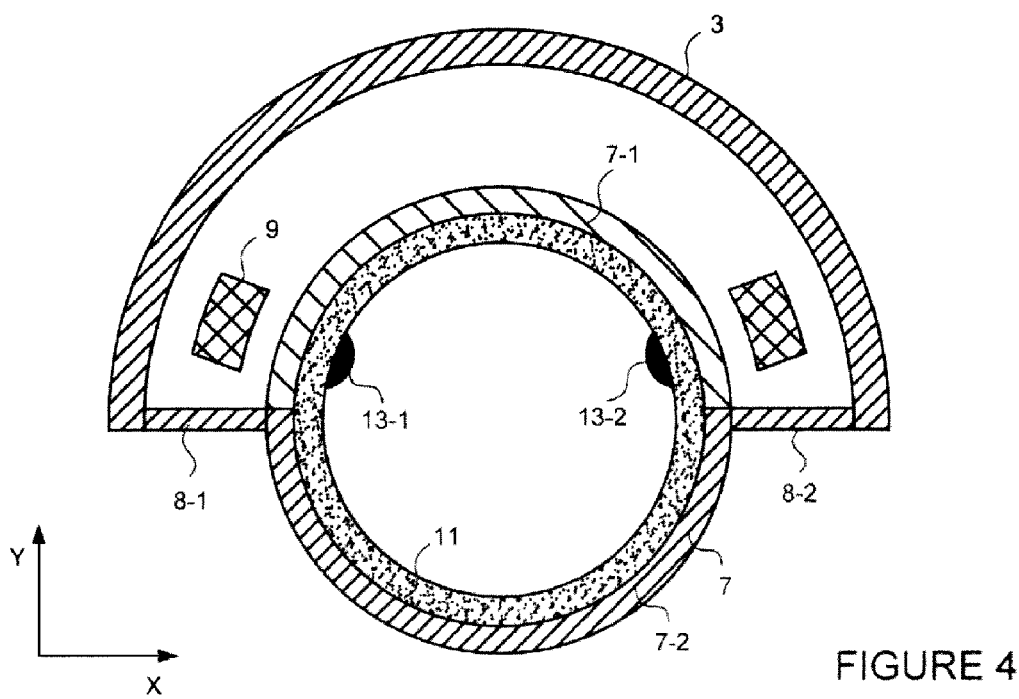
FIG. 4 is a cross sectional view of an electromagnetic flow meter according to a third embodiment.

In the above embodiments, a single saddle shaped coil 9 is provided which surrounds an upper portion 7-1 of the flow conduit 7. The coil 9 curves around the outer surface of the flow conduit 7 over a segment angle ($\theta$) of approximately 145 degrees and the electrodes 13 are positioned inside this segment angle. FIG. 4 illustrates a third embodiment in which the electrodes 13 are located on the segment angle, i.e. in line with the coil bundles forming the coil 9.

Fourth Embodiment

Figure 5:
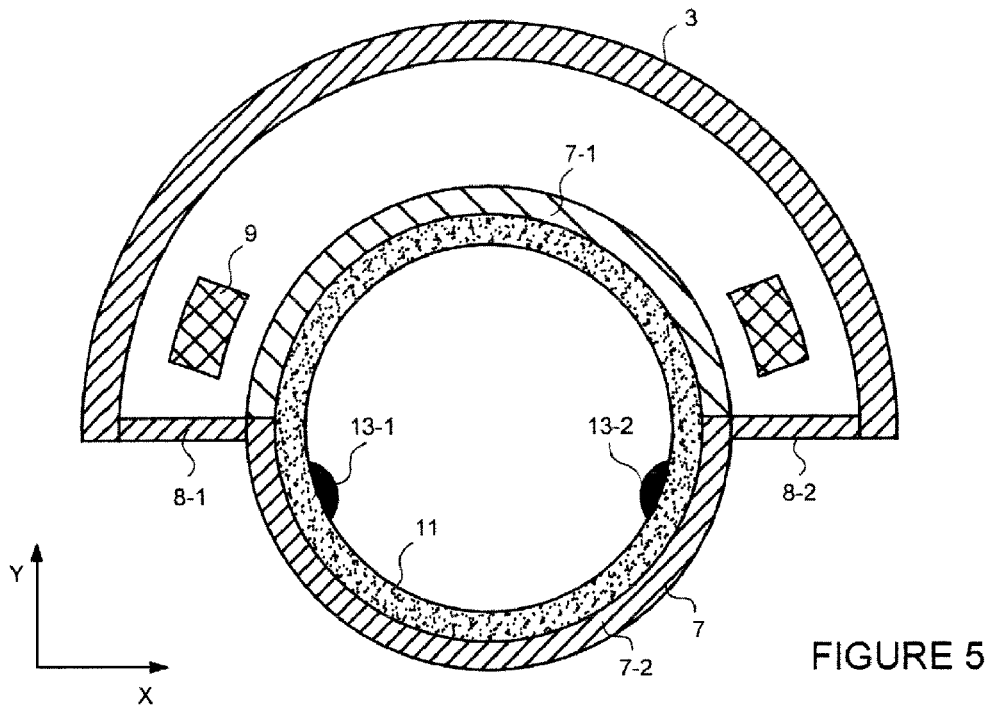
FIG. 5 is a cross sectional view of an electromagnetic flow meter according to a fourth embodiment.

FIG. 5 illustrates an embodiment where the electrodes 13 are provided outside the segment angle of the coil 9. The inventors have found that positioning the electrodes outside the segment angle of the coil provides the best performance in terms of hydraulic behavior with skewed velocity profiles. However, positioning the electrodes outside the coil angle in the manner illustrated in FIG. 5 makes it more difficult to manufacture the flow meter 1 as the connections to the electrodes (which are usually made radially through the wall of the flow conduit 7 and the liner 11 at the location of the electrode) will be made outside the housing 3.

Fifth Embodiment

Figure 6:
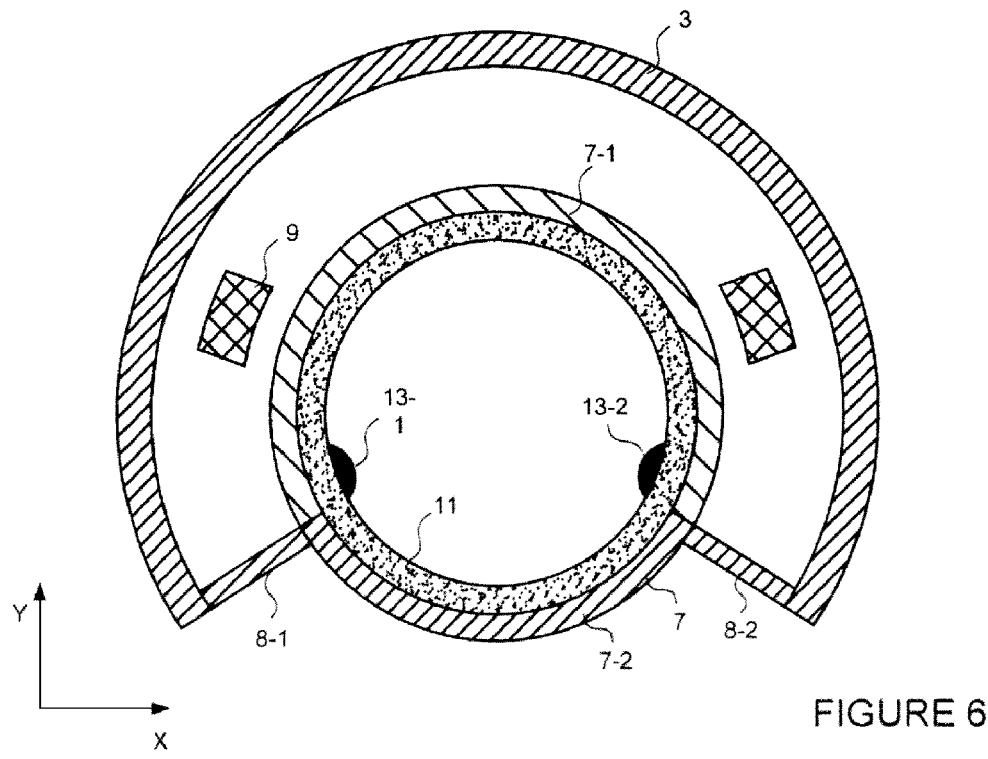
FIG. 6 is a cross sectional view of an electromagnetic flow meter according to a fifth embodiment.

One way to overcome this problem would be to extend the housing 3 so that it covers the electrodes, as illustrated in FIG. 6. However, this is not preferred as it will increase the size of the upper portion 7-1 that is made of stainless steel.

Alternatively, the housing 3 could be extended and the upper portion 7-1 kept the same as in FIG. 5.

Sixth Embodiment

An alternative solution to this problem is to reduce the segment angle of the coil 9 whilst keeping the electrodes 13 in the position shown in FIG. 4. Such an embodiment is shown in FIG. 7.

Seventh Embodiment

Figure 7:
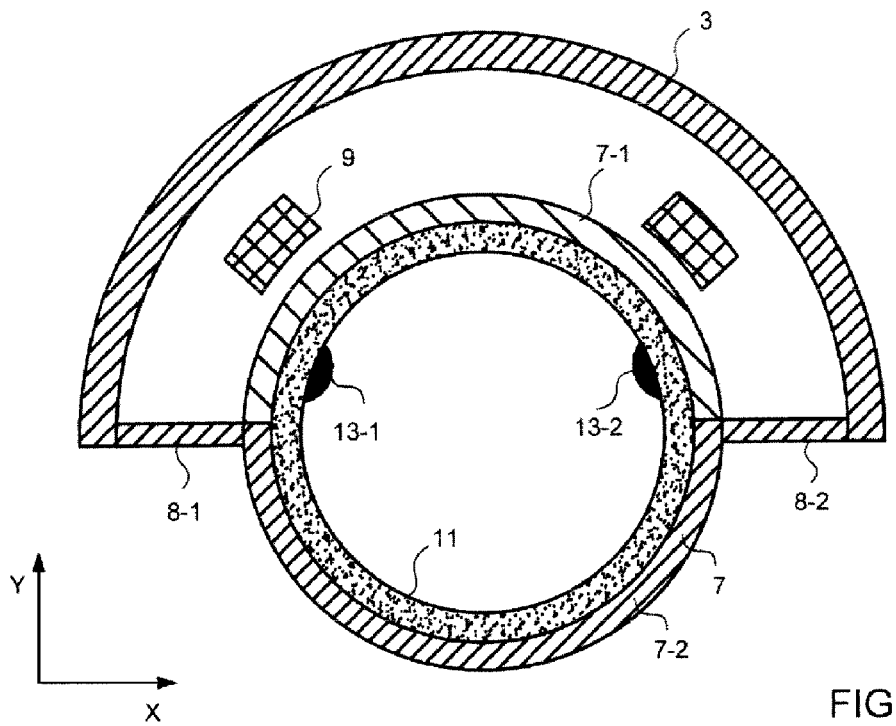
FIG. 7 is a cross sectional view of an electromagnetic flow meter according to a sixth embodiment.
Figure 8:
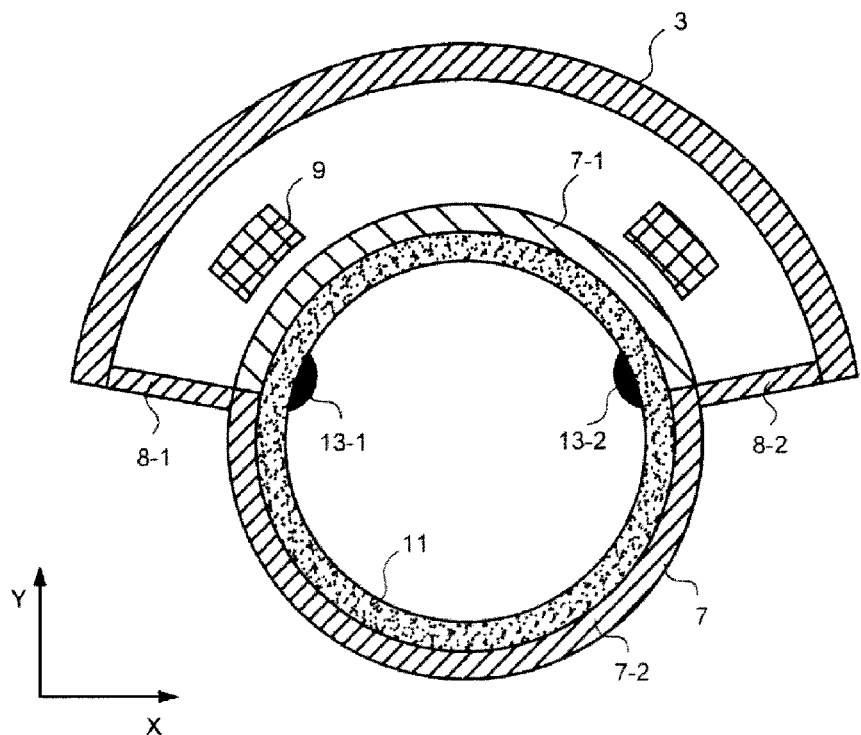
FIG. 8 is a cross sectional view of an electromagnetic flow meter according to a seventh embodiment.

In the embodiment shown in FIG. 7, the upper half 7-1 of the flow conduit 7 was made from a material having a relatively low magnetic permeability (such as stainless steel) whilst the lower half was made from a material having a higher magnetic permeability (such as carbon steel). However, as the segment angle of the coil 9 has been reduced in the design of FIG. 7, it is possible to reduce the size of the upper portion 7-1. This is illustrated in FIG. 8. As shown, the upper portion 7-1 of the flow conduit 7 only extends over an angle of approximately 150°. As those skilled in the art will appreciate, this design will reduce further the amount of stainless steel (or similar material) required for the flow conduit 7. The inventors have found that as long as the transitions between the stainless steel and the carbon steel are outside the segment angle ($\theta$) of the coil 9, then the flow meter will work in the same way as if the entire flow conduit 7 is made of stainless steel; and that if the transitions between the stainless steel and the carbon steel are inside the segment angle of the coil 9, then there is a significant reduction in output signal levels.

Method of Manufacture

In the above embodiments, a bi-material tubular pressure containing conduit 7 was provided to carry the fluid to be metered through the measuring section 4 of the flow meter 1. This bi-material conduit 7 can be manufactured in a number of different ways depending on the materials used. When stainless steel and carbon steel are used as the two materials, the flow conduit 7 is preferably manufactured by providing a flat sheet of carbon steel of the required length (corresponding at least to the length of the measuring section) and of the required width to form the lower portion 7-2 of the flow conduit 7; and a flat sheet of stainless steel having the same length and having a width required to form the upper portion 7-1 of the flow conduit 7. The two sheets of steel are then placed side by side and welded together along the length of the sheets. The joined sheets are then rolled to form a tube so that the outer edges of the two sheets come into contact with each other. This second edge of the two sheets is then welded together to form the bi-metallic flow conduit 7.

Alternatively, the two sheets of steel may be rolled to the required diameter and both edges then welded together to form the tube. The advantage of this latter method is that it is easier to form a flow conduit 7 which does not have a circular cross-sectional shape. For example, the sheets of steel may be bent over a hexagonal former so that the resulting flow conduit 7 will have a hexagonal cross-sectional shape. As those skilled in the art will appreciate, other cross-sectional shapes may also be formed.

Insert Flow Meters

Figure 9:
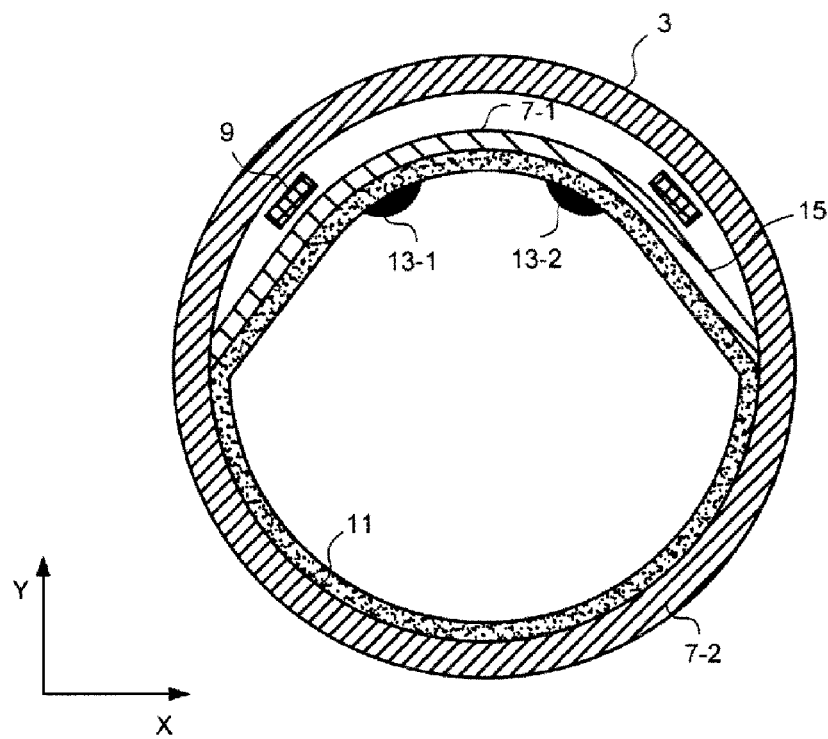
FIG. 9 is a cross sectional view of an electromagnetic flow meter according to an eighth embodiment.

In the above embodiments, the coil 9 was provided on the outside of the flow conduit 7. FIG. 9 illustrates an embodiment where the housing 3 forms at least part of the flow conduit 7 through which the fluid to be metered passes. As shown, in this case, the lower half 7-2 of the housing 3 forms part of the pressure containing flow conduit whilst the upper part of the pressure containing flow conduit 7-1 is provided by a rigid curved plate 15 which is joined to the inside of the tubular housing 3. As those skilled in the art will appreciate, the plate 15 will have to be joined to the tubular housing 3 so that fluid passing along the flow meter will not pass in the space between the plate 15 and the housing 3 in which the coil 9 (and any other components) are located. As shown, in FIG. 9, in this embodiment, an insulating liner 11 and electrodes 13 are also provided as before.

As those skilled in the art will appreciate, in this embodiment, the plate 15 and the lower half 7-2 of the housing 3 will, together, form the pressure containing conduit 7 of the measuring section. In this embodiment, the housing 3 is formed of carbon steel and the curved plate 15 is formed of stainless steel which allows the magnetic field generated by the coil to pass through into the inside of the flow conduit.

In the embodiment illustrated in FIG. 9, the electrodes 13 are provided inside the segment angle of the coil 9. As those skilled in the art will appreciate, the electrodes 13 may be provided on the outside of the segment angle of the coil 9, as illustrated in FIG. 10.

Figure 10:
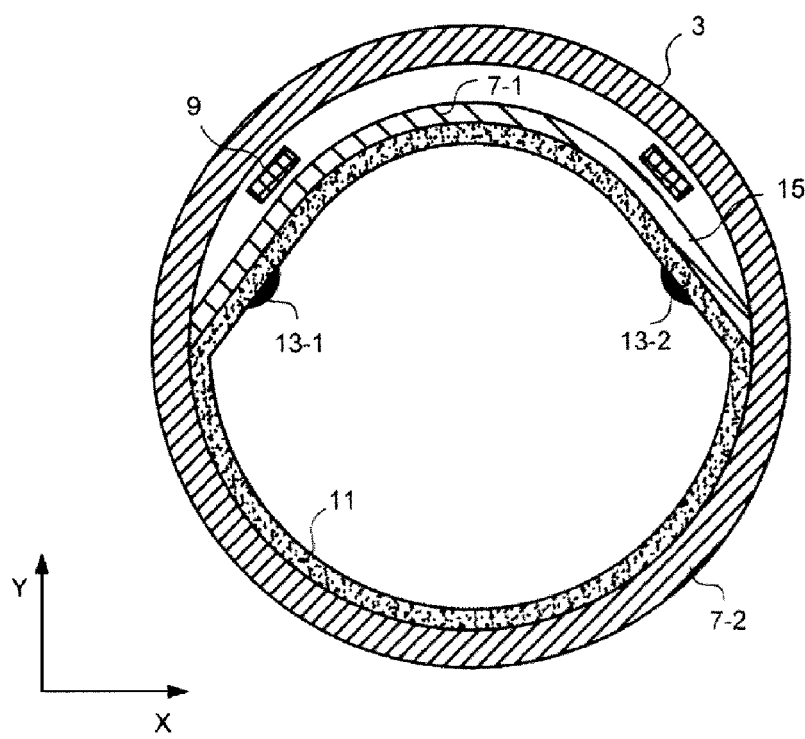
FIG. 10 is a cross sectional view of an electromagnetic flow meter according to a ninth embodiment.
Figure 11:
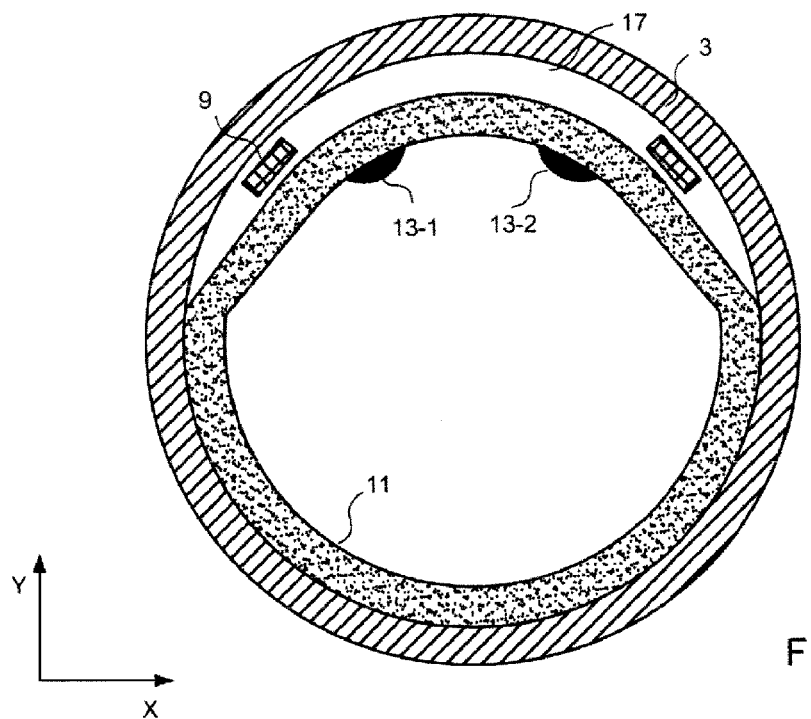
FIG. 11 is a cross sectional view of an electromagnetic flow meter according to a tenth embodiment.
Figure 12:
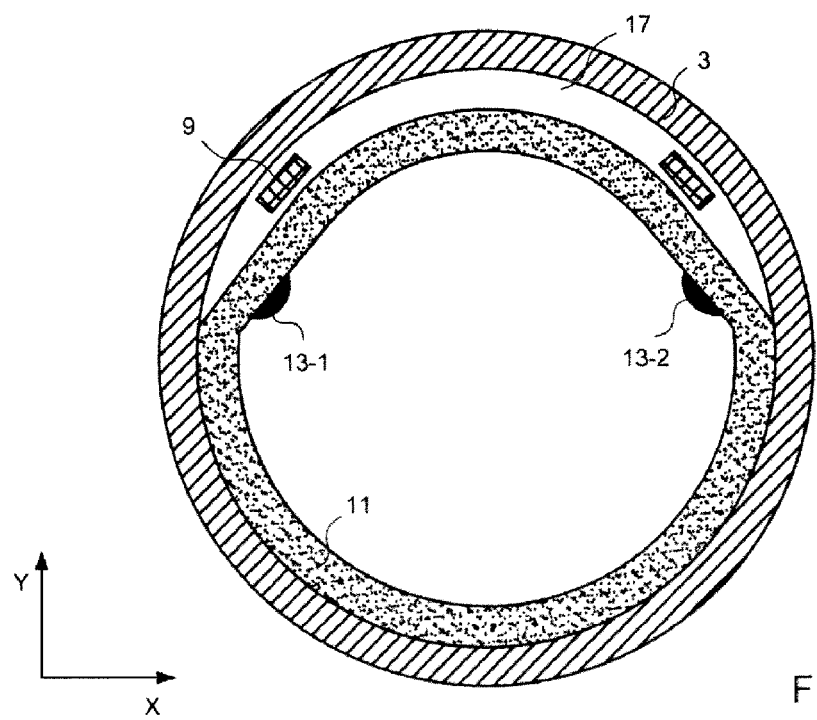
FIG. 12 is a cross sectional view of an electromagnetic flow meter according to an eleventh embodiment.
Figure 13D:
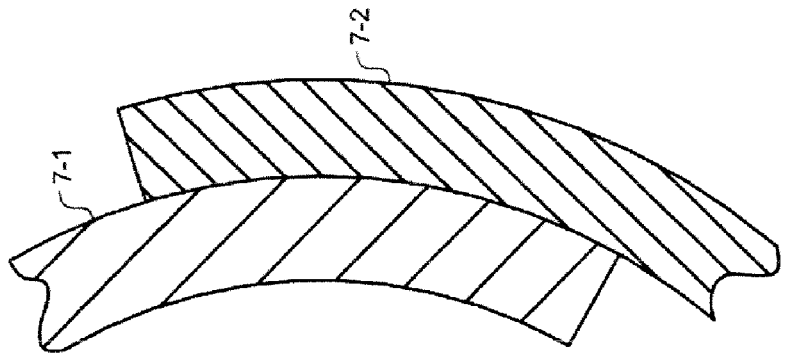
FIGS. 13a to 13d schematically illustrate different ways in which the two portions of the conduit or vessel may be connected together.
Figure 13C:
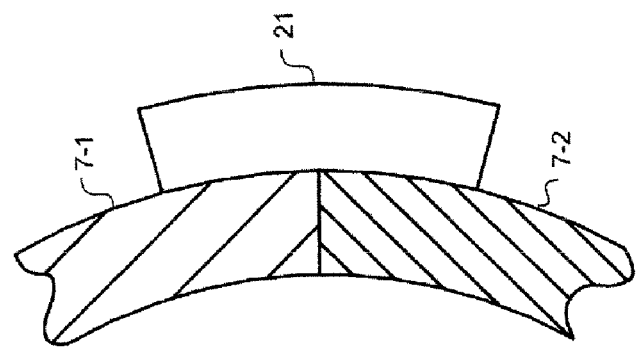
Figure 13B:
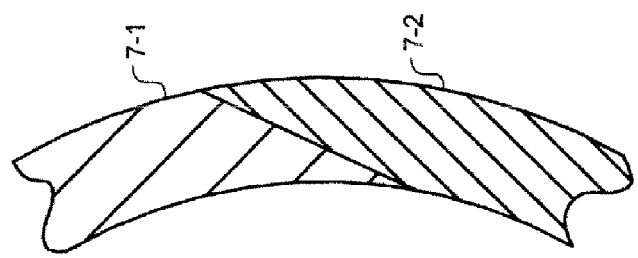
Figure 13A:
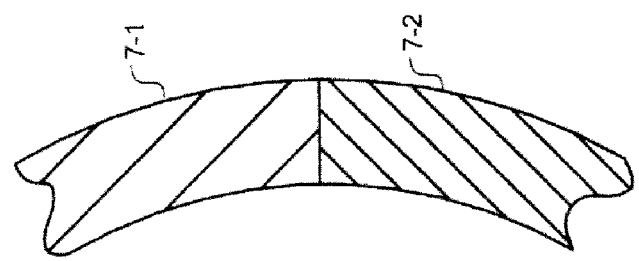

FIGS. 11 and 12 illustrate modifications to the designs shown in FIGS. 9 and 10. In particular, in these designs, there is no stainless steel plate 15. Instead, the space 70 between the liner 11 and the housing 3 in which the coil 9 is located is back-potted with a suitable potting compound (such as epoxy resin or polyurethane) to provide the required structural stability to the liner 11 in this upper portion. As shown, the lower half of the liner 11 conforms to the inner surface of the housing 3 and therefore the housing 3 provides the required structural stability over the lower part of the liner 11.

Other Modifications and Alternatives

Various electromagnetic flow meters have been described above and as those skilled in the art will appreciate, a number of modifications to those flow meters may be made and some of these will now be described.

In the above embodiments, the electrodes 13 were mounted on the inside of the flow conduit so that they are in contact with the fluid being metered. In an alternative embodiment, the electrodes may be embedded in the walls of the liner so that they sense the voltage induced in the fluid capacitively.

In the above embodiments, a pressure containing conduit was used to define the measuring section of an electromagnetic flow meter. The pressure containing conduit has two different sections made of different materials with different magnetic properties. Stainless steel was used for a first portion of the pressure containing vessel and carbon steel was used for the second portion of the pressure containing vessel. As those skilled in the art will appreciate, other materials may be used. For example, instead of stainless steel, aluminum or an appropriate polymer may be used instead. Similarly, materials other than carbon steel may be used for the second portion of the pressure containing vessel.

As those skilled in the art will appreciate, the two portions of the pressure containing vessel may be connected together in various different ways, some of which are illustrated in FIG. 13. In particular, FIG. 13a illustrates that the two portions 7-1 and 7-2 may meet with their abutment surfaces being perpendicular to the walls; FIG. 13b illustrates that the two portions 7-1 and 7-2 may meet with their abutment surfaces lying at an angle so that the walls of the two portions overlap each other; FIG. 13c illustrates an alternative way of joining the two portions using a attachment plate 21 that is fixed to each part; and FIG. 13d illustrates the possibility of overlapping the walls of the two portions 7-1 and 7-2 and joining the two portions along the overlap.

In the embodiments described above, reference has been made to upper and lower portions of the flow conduit. As those skilled in the art, these are relative terms which are not important to the invention as the flow meter may be oriented in a different orientation to that shown in the drawings, for example so that the stainless steel section is "below" or to one side of the carbon steel portion.

In the above embodiment, the saddle shaped coil enclosed a substantially rectangular area. As those skilled in the art will appreciate, saddle coils which enclose different shaped areas may be used. For example, a saddle shaped coil which encloses a diamond shaped area may be used. Alternatively, a bobbin coil wound on a pole piece may be used to generate the desired magnetic field pattern.

In the above embodiments, the measuring section 4 has a cross-sectional shape which is smaller than the cross-sectional shape of the housing 3. The inlet 2 therefore preferably transitions smoothly from the cross-sectional shape of the housing 3 to the cross-sectional shape of the measuring section 4 and similarly the outlet 6 preferably transitions smoothly from the cross-sectional shape of the measuring section 4 to the cross-section of the housing 3. As those skilled in the art will appreciate, this smooth transition will reduce turbulent fluid flow through the measuring section, which in turn makes the measurements more reliable.

What is claimed is:

1. An electromagnetic flow meter apparatus comprising:
  a flow conduit defining a flow path along which a fluid can flow, the flow conduit having:
    i) an inlet for receiving the fluid;
    ii) an outlet for outputting the fluid; and
    iii) a measuring section which extends along the flow path and which is positioned between said inlet and outlet;
  a coil positioned adjacent said measuring section for generating a magnetic field across the measuring section; and
  at least one electrode positioned adjacent said measuring section for sensing a voltage induced in the fluid flowing through the measuring section as a result of said magnetic field, which voltage varies with a flow rate of the fluid;
  wherein said measuring section is defined by a pressure containing vessel having first and second sections; wherein the first section is formed of a first material having a first magnetic permeability and the second section is formed of a second material having a second magnetic permeability that is different from the first permeability; and wherein said coil is located adjacent said first section of the pressure containing vessel.

2. An apparatus according to claim 1, wherein said first and second sections of the pressure containing vessel abut against each other.

3. An apparatus according to claim 1, wherein said second section is substantially tubular and wherein said first section is positioned within the second section.

4. An apparatus according to claim 3, wherein said coil is positioned within a space defined between said first and second sections.

5. An apparatus according to claim 1, wherein said pressure containing vessel has a substantially tubular shape.

6. An apparatus according to claim 5, wherein said first and second sections abut each other to define said substantially tubular shape.

7. An apparatus according to claim 6, wherein said first section has a first edge which abuts against a first edge of said second section and a second edge that abuts against a second edge of said second section.

8. An apparatus according to claim 1, wherein said first and second sections are joined together to form said pressure containing vessel.

9. An apparatus according to claim 1, wherein the magnetic permeability of said first section is lower than the magnetic permeability of the second section.

10. An apparatus according to claim 9, wherein said first section is made of a stainless steel that allows the magnetic field from said coil to pass into the measuring section and wherein said second section is made of carbon steel.

11. An apparatus according to claim 1, wherein said first section forms a smaller part of said pressure containing vessel than said second section.

12. An apparatus according to claim 1, wherein said coil is a saddle shaped coil that extends along the length of the measuring section and that is curved around an outer wall of the pressure containing vessel.

13. An apparatus according to claim 12, wherein said saddle shaped coil is curved around an outer wall of the pressure containing vessel over an effective angle of between 45 and 180 degrees.

14. An apparatus according to claim 1, comprising at least two electrodes positioned at opposite sides across the measuring section and operable to sense the voltage galvanically or capacitively.

15. An apparatus according to claim 14, wherein said electrodes are positioned such that they are not diametrically opposing each other.

16. An apparatus according to claim 1, further comprising an insulating liner provided on an internal surface of said pressure containing vessel.

17. A pressure containing vessel for use in an electromagnetic flow meter apparatus comprising:
   a flow conduit defining a flow path along which a fluid can flow, the flow conduit having:
   i) an inlet for receiving the fluid;
   ii) an outlet for outputting the fluid; and
   iii) a measuring section which extends along the flow path and which is positioned between said inlet and outlet;
   a coil positioned adjacent said measuring section for generating a magnetic field across the measuring section; and
   at least one electrode positioned adjacent said measuring section for sensing a voltage induced in the fluid flowing through the measuring section as a result of said magnetic field, which voltage varies with a flow rate of the fluid;
   wherein said measuring section is defined by a pressure containing vessel having first and second sections; wherein the first section is formed of a first material having a first magnetic permeability and the second section is formed of a second material having a second magnetic permeability that is different from the first permeability; and wherein said coil is located adjacent said first section of the pressure containing vessel;
   wherein the pressure containing vessel being substantially tubular and comprising first and second sections; wherein the first section is formed of a first material having a first magnetic permeability and the second section is formed of a second material having a second magnetic permeability that is different from the first permeability.

18. A vessel according to claim 17, wherein said second section is tubular and wherein said first section is positioned within the second section.

19. A vessel according to claim 17, wherein said first and second sections abut each other to define the substantially tubular shape of the pressure containing vessel.

20. A vessel according to claim 19, wherein said first section has a first edge which abuts against a first edge of said second section and a second edge that abuts against a second edge of said second section.

21. A vessel according to claim 20, wherein said first and second sections are joined together to define said pressure containing vessel.

22. A vessel according to claim 17, wherein the magnetic permeability of said first section is lower than the magnetic permeability of the second section.

23. A vessel according to claim 22, wherein said first section is made of a stainless steel through which magnetic fields can pass and wherein said second section is made of carbon steel.

24. A vessel according to claim 17, wherein said first section forms a smaller part of said pressure containing vessel than said second section.

25. A vessel according to claim 17, having a cross-sectional shape which is non-circular.

26. A method of manufacturing a substantially tubular pressure vessel for use in an electromagnetic flow meter, the method comprising providing a first section of a first material having a first magnetic permeability and a second section of a second material having a second permeability that is different from the first permeability, and joining the first and second sections together to form the pressure containing vessel.

27. An electromagnetic flow meter apparatus having a tubular flow conduit and an insert or liner disposed therein, wherein the insert or liner includes a first part which conforms to the shape of the tubular conduit and a second part that defines a space between the liner or insert and the tubular flow conduit, in which space a coil is mounted and which is back potted with a potting compound to support the liner or insert under the pressure of fluid flowing, in use, through the flow meter.

28. An apparatus according to claim 27, wherein the liner or insert defines a generally asymmetric channel through which the fluid can flow.

* * * * *